Figure 1:
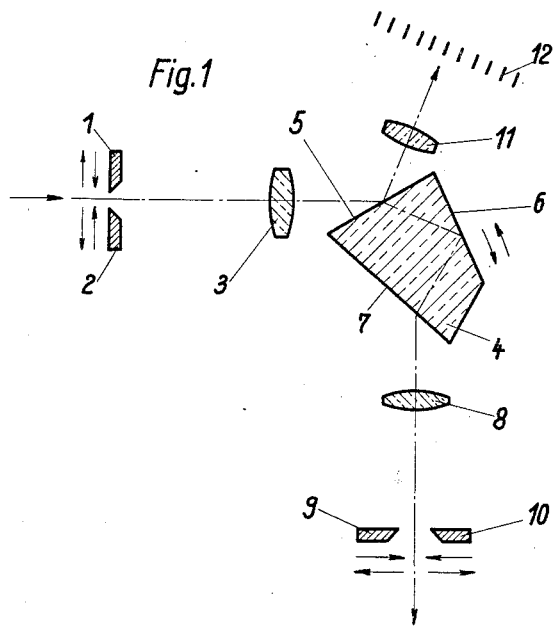

Patented Dec. 29, 1953

2,664,024

UNITED STATES PATENT OFFICE 2,664,024

WAVE LENGTH INDICATOR IN SPECTRAL APPARATUS

Gerhard Hansen, Heidenheim on the Brenz, Germany, assignor to Zeiss-Opton Optische Werke Oberkochen G. m. b. H., Oberkochen, Wurttemberg, Germany Application March 11, 1950, Serial No. 149,101

Claims priority, application Germany March 23, 1949

2 Claims. (Cl. 88—14)

In the familiar spectral apparatus, e. g. monochromators with a rotatable dispersing element for changing the transmitted wave lengths, such as a rotatable prism or a rotatable grating, a stationary index serves for reading the position of the dispersing element and therewith the transmitted wave lengths. The index coacts with a scale placed upon a drum which sits on a head serving to turn the dispersing element. In consequence the activating movement requires a very precise construction since all eventual inaccuracies of the motion affect the reading.

According to the invention a stationary scale serves for the reading of the position of the dispersing element and as its index an image of the entrance slit of the collimator which is formed by light rays reflected by a reflecting plane rigidly connected with the dispersing element. As a consequence the reading is directly dependent upon the position of the dispersing element and is no longer under the influence of eventual inaccuracies of the activating movement.

It is particularly simple to employ as the mentioned reflecting plane one of the faces of the dispersing element itself. This permits at the same time to utilize that part of the rays entering the apparatus which is reflected by the concerned plane.

Aside from the above stated advantage of independence of the accuracy of the activating movement, the object of the invention further offers the advantage that the scale required for it can be produced photographically which is essentially simpler than production of the customary scale placed upon a drum. Also in the object of the invention, if in an instrument with different prisms or gratings simultaneously with such a one the scale also must be changed the scales coming into consideration can be much more conveniently placed than is the case with divided drums. Under circumstances one can even place a plurality of scales permanently on the instrument since they occupy little space, so that they can be conveniently interchanged equally well one for the other.

Finally in the object of the invention there yet results the following advantage. Assuming that the exit slit of the instrument is set upon the same width as the entrance slit, the size of the wave-length region transmitted by the instrument is dependent upon the width of the entrance slit. As a consequence the image of the entrance slit projected upon the scale permits reading from it this wave-length region, whereas in the hitherto known instruments it is necessary to ascertain the wave-length region from the position of the dispersing element and the width of the entrance slit with the aid of tables calculated for the instrument concerned.

In the drawing the invention is illustrated by two examples. Fig. 1 shows a refracting monochromator and Fig. 2 a reflecting monochromator.

In the example according to Fig. 1 the two symmetrically adjustable jaws of an entrance slit, lying in the focal plane of a collective lens 3, are designated with 1 and 2. The pencils of rays coming from the entrance slit leave lens 3 as parallel rays and fall upon a dispersing prism 4 which is rotatable within a certain compass. The rays falling upon the entrance face 5 of this prism in the main enter the prism, whereby they suffer a refraction, are reflected by a reflecting face 6 of the prism and leave the prism through its exit face 7, whereby they again suffer a refraction. The rays then enter a collecting lens 8. In the focal plane of this lens lie the jaws 9 and 10 of an exit slit, in this the rays leaving lens 8 are united by it. That part of the rays falling upon the entrance face 5 of prism 4 which does not enter this face, is reflected at it and is united by a collective lens 11 upon a scale 12, lying in its focal plane, numbered in wave-lengths, so that upon this is projected an image of the entrance slit 1, 2.

If through rotation of prism 4 its position is changed then the image of the entrance slit projected by lens 11 travels upon the scale 12 and the two edges of the image of the entrance slit permit directly reading the boundaries of the wave-length region transmitted by the monochromator at any given time.

Figure 2:
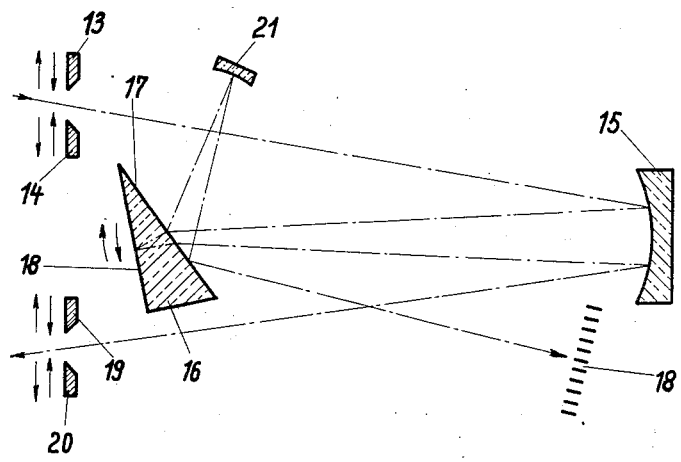

In the example according to Fig. 2 the two symmetrically adjustable jaws of an entrance slit, lying in the focal plane of a concave mirror 15, are designated with 13 and 14. The pencils of rays coming from the entrance slit return as parallel rays from this concave mirror and fall upon a dispersing prism 16 which is rotatable within a certain compass. The rays falling upon the entrance face 17 of this prism in the main enter the prism, whereby they suffer a refraction, are reflected by a reflecting face 18 of the prism, leave the prism through its face 17, whereby they again suffer a refraction, and then again fall upon the concave mirror 15. In its focal plane likewise lie the symmetrically adjustable jaws 19 and 20 of an exit slit, in this the rays returning from the concave mirror 15 are united by it. That part of the rays falling upon the entrance face 17 of the prism 16 which does not enter this face is reflected at it and falls upon a concave mirror 21. This reflects these rays upon the face 17, which in turn throws them upon a scale 18, numbered in wave-lengths, which lies in the focal plane of mirror 21, so that an image of the entrance slit 13, 14 is projected upon this scale.

If through rotation of prism 16 its position is changed, then the image of the entrance slit projected by the concave mirror 21 travels upon the scale 18. If thereby the concave mirror 21 participates in the rotation of prism 16, the edges of the image of the entrance slit again permit direct reading of the boundaries of the wavelength region transmitted by the monochromator at any given time. If however the concave mirror 21 is stationary, the divisions of the wavelength scale 18 must receive double the separation as compared to the construction with rotatable concave mirror 21, and therefore, since the width of the image of the entrance slit is the same in both instances, to determine the width of the wave-length region transmitted at any given time double the value of the width of the slit image is to be taken into consideration.

I claim:

1. In a spectral monochromator apparatus at least including a dispersive prism element rotatably located within said apparatus, an entrance and an exit slit both of variable width fitted on said apparatus the combination with means for reading the range and width of wave length of the rays leaving said apparatus through said exit slit, said means comprising a light reflecting plane firmly united with said dispersive element, a wave length scale fixed to said apparatus, and optical means interposed between said light reflecting plane and said scale such as to form on said scale by means of the rays leaving said entrance slit and being reflected from said reflecting plane, an image of said entrance slit.

2. A spectral apparatus according to claim 1, said light reflecting plane being formed by said dispersive prism light entrance surface.

GERHARD HANSEN.

References Cited in the file of this patent

UNITED STATES PATENTS

| Number | Name | Date |
|---|---|---|
| 1,899,804 | Hopfield | Feb. 28, 1933 |
| 2,307,951 | Plaut et al. | Jan. 12, 1943 |

OTHER REFERENCES

Mahan, A. I., "Oscillator Strengths For the Liquid Phase," pages 248 through 259, Journal of the Optical Society of America, vol. 31, March 1941.

Hardy et al., Principles of Optics, published by McGraw-Hill Book Company, New York City 1932, first edition, pages 372 through 377.